US005983834A

United States Patent [19]
Tai

[11] Patent Number: 5,983,834
[45] Date of Patent: Nov. 16, 1999

[54] OZONE INJECTION SYSTEM FOR A LIVESTOCK BUILDING

[76] Inventor: Paul Ling Tai, 421 Glazier, Chelsea, Mich. 48118

[21] Appl. No.: 09/170,445

[22] Filed: Oct. 13, 1998

Related U.S. Application Data

[60] Provisional application No. 60/062,398, Oct. 14, 1997, and provisional application No. 60/088,404, Jun. 8, 1998.

[51] Int. Cl.⁶ ........................................ A01K 1/00
[52] U.S. Cl. ............................................. 119/448
[58] Field of Search .................... 119/416, 418, 119/447, 448, 420; 210/605, 512, 626, 627; 422/5, 186.07

[56] References Cited

U.S. PATENT DOCUMENTS

| | | |
|---|---|---|
| 1,714,562 | 5/1929 | Keiser . |
| 2,358,000 | 9/1944 | Cornell ........................................ 31/58 |
| 3,155,609 | 11/1964 | Pampel ........................................ 210/3 |
| 3,601,096 | 8/1971 | Rutherford ................................. 119/15 |
| 3,633,547 | 1/1972 | Stevens, et al. . |
| 3,658,305 | 4/1972 | Newtson . |
| 3,773,659 | 11/1973 | Carlson et al. . |
| 3,810,548 | 5/1974 | Blough .................................... 210/242 |
| 3,884,804 | 5/1975 | Robinson et al. . |
| 3,918,404 | 11/1975 | Bunger . |
| 3,959,135 | 5/1976 | Shattock ................................... 210/77 |
| 3,960,718 | 6/1976 | Lebo ......................................... 210/14 |
| 3,981,800 | 9/1976 | Ort ............................................. 210/6 |
| 3,982,499 | 9/1976 | Frankl . |
| 3,991,717 | 11/1976 | Buchanan ................................. 119/19 |
| 4,028,246 | 6/1977 | Lund et al. ............................. 210/151 |
| 4,107,268 | 8/1978 | O'Neill et al. .......................... 423/210 |

(List continued on next page.)

OTHER PUBLICATIONS

Hogs Today; "Sulfide Solutions"; Oct. 1997.
Indianapolis Star; "Confined Operations Feed Controversey"; Oct. 9, 1997.

Farm Journal; "Hog Moratorium Sets Industry Precedent"; Oct. 1997.

Hogs Today; "NPPC's New Link to the Environment"; Oct. 1997.

(List continued on next page.)

*Primary Examiner*—Robert P. Swiatek
*Assistant Examiner*—Yvonne R. Abbott
*Attorney, Agent, or Firm*—Lyon, P.C.

[57] ABSTRACT

A method and system for ozone injection into a livestock building is described. Ozone is homogeneously transferred, preferably from a remote location, throughout the air in the building at levels considered safe by OSHA. Ozone thus affects a reduction in dust, flies, and relative humidity, thereby inhibiting primary disease-causing vectors.

Ozone is also homogeneously distributed through an upper stratum of manure liquid contained within a pit in the building thereby creating an aerobic "cap", while still maintaining an anaerobic lower stratum. A perforated tube or plurality of tubes fixed within the upper stratum serves to distribute the ozone. Ozone applied in this environment unexpectedly inhibits the fly population through retardation of larvae maturation. Alternately, a buoyant vehicle propelled across the surface 19 of the liquid may also serve to distribute the ozone and create the ozonated "cap". The vehicle provides an additional benefit of crust fragmentation and prevention thereby further inhibiting and eliminating fly propagation, and hygienically improving pit operation. In either embodiment, the ability to create an aerobic and anaerobic balance within the liquid facilitates a reduction in odor, a significant improvement of organic digestion and solids control, and a reduction in pathogens often found in water recycled from the containment area

10 Claims, 4 Drawing Sheets

U.S. PATENT DOCUMENTS

| | | |
|---|---|---|
| 4,178,239 | 12/1979 | Lowther . |
| 4,226,832 | 10/1980 | Roumens ................................. 422/184 |
| 4,235,376 | 11/1980 | Cohen et al. ........................... 239/155 |
| 4,292,328 | 9/1981 | Coulthard et al. .......................... 426/2 |
| 4,348,285 | 9/1982 | Groeneweg ............................ 210/602 |
| 4,432,869 | 2/1984 | Groeneweg ............................ 210/602 |
| 4,455,232 | 6/1984 | Reid ....................................... 210/628 |
| 4,493,289 | 1/1985 | Saurenman ............................... 119/21 |
| 4,643,830 | 2/1987 | Reid ....................................... 210/629 |
| 4,645,603 | 2/1987 | Frankl .................................... 210/629 |
| 5,015,384 | 5/1991 | Burke ..................................... 210/603 |
| 5,053,140 | 10/1991 | Hurst ...................................... 210/704 |
| 5,071,566 | 12/1991 | Papp et al. ............................. 210/713 |
| 5,116,760 | 5/1992 | Tanaka et al. .......................... 435/290 |
| 5,121,708 | 6/1992 | Nuttle ........................................ 119/3 |
| 5,158,037 | 10/1992 | Engelbart ................................... 119/3 |
| 5,173,268 | 12/1992 | Weaver .......................... 411/186.115 |
| 5,213,692 | 5/1993 | Hjersted ................................. 210/709 |
| 5,216,976 | 6/1993 | Marinkovich .............................. 119/3 |
| 5,254,252 | 10/1993 | Drenner ................................. 210/602 |
| 5,259,959 | 11/1993 | Mulder ..................................... 20/610 |
| 5,266,201 | 11/1993 | Letourneux ............................ 210/620 |
| 5,290,451 | 3/1994 | Koster et al. ........................... 210/605 |
| 5,298,198 | 3/1994 | LaCrosse ................................. 261/76 |
| 5,302,180 | 4/1994 | Hjersted ..................................... 71/24 |
| 5,322,035 | 6/1994 | Hawes et al. ........................... 119/227 |
| 5,411,569 | 5/1995 | Hjersted ..................................... 71/24 |
| 5,472,472 | 12/1995 | Northrop ..................................... 71/9 |
| 5,501,844 | 3/1996 | Kasting, Jr. et al. .............. 422/186.15 |
| 5,514,345 | 5/1996 | Garbutt et al. . |
| 5,538,529 | 7/1996 | Northrop ..................................... 71/9 |
| 5,568,895 | 10/1996 | Webb et al. . |
| 5,587,320 | 12/1996 | Shindo et al. ....................... 435/290.1 |
| 5,593,099 | 1/1997 | Langenecker ........................ 241/46.02 |
| 5,599,451 | 2/1997 | Guiot ...................................... 210/605 |
| 5,616,163 | 4/1997 | Halfter ....................................... 71/15 |
| 5,626,644 | 5/1997 | Northrop ..................................... 71/9 |
| 5,633,163 | 5/1997 | Cameron ................................ 435/262 |
| 5,656,059 | 8/1997 | Monster et al. .............................. 71/7 |
| 5,656,246 | 8/1997 | Patapoff et al. . |
| 5,833,740 | 11/1998 | Brais . |

OTHER PUBLICATIONS

The Des Moines Register; "DNR Wants to Toughen Manure Rules"; Oct. 21, 1997.
The Des Moines Register; "Legal Action Eyed Against Hog Farmer in Clinton County"; Oct. 29, 1997.
Pork '97; "All Are Not Created Equal"; May 1997.
J. Environ. Qual.26:740–743 (1997); "Controlling Odor and Volatile Substances in Liquid Hog Manure by Amendment".
Hogs Today; "Waste Master Portable Unit Chemically Treats Slurry to Capture More Solids"; Jun. 1997.
The Des Moines Register; "Proposed Hog–Facility Restrictions Praised"; Oct. 22, 1997.
The Land; "Minnesota River Improves"; Oct. 17, 1997.
Hogs Today; "Going Nuts, Recycling a Local Commodity Adds Value to Hog Wastes"; Oct. 1997.
Wall Street Journal; "Town Welcomes Pigs; Pigs Outstay Welcome"; 1997.
Wat. Sci. Tech., vol. 31, No. 11; "Evaluation of Odour Removal by Pilot–Scale Biological Treatment Process Trains During Spring Runoff in an Ict–Covered River"; 1995.
Manure Management, "ABC Ready to Change Manure Management".
Feedstuffs, "Murphy Gears Waste Policy to Environmental Challenge".
Feedstuffs, Simmons to Meet Over Charges Leak; Dec. 30, 1996.
Feedstuffs, "Former Darling Plant Managers Indicted in River Pollution Case"Feb. 10, 1997.
Feedstuffs, "Big Lagoons and the 'N factor'", Feb. 17, 1997.
Money, "'Factory Farm' Plan for Hogs is Resisted"; Mar. 21, 1997.
Pork '97, "Dilution is Key to Lagoon Management"; May, 1997.
Successful Farming; "Manure Storage Covers"; Sep. 1997.
Successful Farming; "Port Producers Line Up for On–Farm Odor Audit"; Sep. 1997.
National Hog Farmer; "Going Beyond State Regulations"; Sep. 1997.
Southern Hogs; "N. C. Lawmakers Support Moratorium on Hog Farms"; Sep./Oct., 1997.
Dairy Today; Wastewater Woes; Oct. 1997.
National Hog Farmer; "On–Farm Odor Audits"; Oct. 15, 1997.
The Des Moines Register; "Harkin Calls for Summit on Animal–Waste Problems"; Oct. 30, 1997.
Hogs Today; "Swimming With the Sharks"; Oct. 1997.
Feedstuffs; "Missouri May File Suit Against PSF"; Nov. 10, 1997.
Feedstuffs; "Odor Control Broadcast to Explain On–Farm Program"; Dec. 22, 1997.
Feedstuffs; "Environmental Framework Released for Pork Producers"; Dec. 22, 1997.
Feedstuffs; "Harkin Releases Targeting Animal Waste"; Jan. 12, 1998.
National Hog Farmer; "Covers, Injection Produce Best Odor Results"; Feb. 15, 1998.
Pork '98; "When and How to Apply Odor Technologies"; Jul. 1998.
National Hog Farms; "Social Influences Affect Odor Perception"; Aug. 15, 1998.
Farm Chemicals; "Uncertainty Still Reigns"; Sep., 1997.
Feedstuffs; "North Carolina Gets Hog Law"; 1997.
Feedstuffs; "Harkin to Seek New Standards on Animal Waste"; Sep. 29, 1997.
Feedstuffs; "NPPC: Environmental Army to be Mobilized for Pork Producers"; Jun. 16, 1997.
Hogs Today; "Pork's Path, Caroll's Foods' Ron Nimmo Shares His Views on the Short and Long Road of the Swine Industry"; Jul./Aug., 1997.
Pig International; "Cleaning Fails to Beat a Worm Problem"; Aug. 1997.
Herald & News; "University Researchers Tackle Smelly Problem"; Sep. 2., 1997.
National Hog Farmer; "Going Beyond State Regulations"; Sep. 15, 1997.
National Hog Farmer; "Flood Irrigation Handles Manure"; Sep. 15, 1997.
Wat. Res., vol. 32, No. 1; "Anaerobic Digestion of Swine Manure: Inhibition by Ammonia"; 1998.

OZONE INJECTION SYSTEM FOR A LIVESTOCK BUILDING

CROSS-REFERENCE TO RELATED APPLICATIONS

The instant application claims the benefit of prior U.S. Provisional Application Ser. No. 60/062,398 filed Oct. 14, 1997, and also of prior U.S. Provisional Application Ser. No. 60/088,404 filed on Jun. 8, 1998.

TECHNICAL ART

The instant invention generally relates to a purification and odor-control system for livestock containment areas.

BACKGROUND OF THE INVENTION

Economic and political pressures are now encouraging the development of pig and livestock farms, in lieu of tobacco farms for example. Recent developments however, have restricted the design of new or expanding pig farms. Concerns such as odor, air quality, and ground and surface water quality, often implicating the Clean Water Act and/or the Clean Air Act, drive the restrictions.

The number of animals housed in a barn, and the resultant manure, contribute to several odor and health related problems. Aside from the private and public nuisance concerns, acute odors also indicate the potential for disease and reduced hog propagation due to respiratory problems, for example. In humans, even lower concentrations (100–300 parts per billion) of gases such as hydrogen sulfide are known to cause eye irritation, headaches, diarrhea, nausea, and an inability to sleep. Many of the gases, bacteria, viruses, spores, and worms found in manure contribute to a number of illnesses that may inhibit the full maturation of the swine, result in condemnation of all or part of the pig, and/or result in their premature deaths. In addition, many pathogens harmful to animals may also be harmful to workers. The swine flu is illustrative. It is believed that insects and birds transfer these pathogens to the surrounding community.

In general, hog manure and urine contains or evolves into ammonia, hydrogen sulfide, methane, nitrates, trihalomethanes, spores of molds, and other contaminants. Research has shown that animal effluvia and the putrefactive gases resulting from animal and vegetable tissue are generally present in and around hog barns. Putrefaction produces highly odorous gases and compounds such as ammonia, amino acids, aromatic fatty acids, metabolites, mercaptans, indole, skatole, cresol, and alkaloid-like ptomaines such as tetramethylene-diamine and pentamethylene-diamine. Of course, the microbiological agents producing these gases are also present in and around barns.

In fact, one of the major concerns within the barn is the amount of dust caused by trampling of the feed and manure, and also from the dander of the animals. As the manure is trampled, it exudes through slots or grates in the concrete floor to a manure pit housed below the animal containment area. As the animals work the manure, odorcausing gases are also liberated. The dust is problematic in several ways. To begin with, particulate sizes of 0.7 to 1.5 microns readily settle within the alveoli of the lungs thereby causing respiratory ailments in pigs or other livestock. Airborne pathogens carried by the dust are thus transferred to the lungs of the livestock, thereby requiring antibiotic treatment. In fact, about 65% of animal diseases are caused due to dust. The same mechanism causes chronic obstructive pulmonary emphysema in humans, also known as "Farmer's Lung" or "Smoker's Lung".

Several methods have been developed to deal with these concerns. Filtration towers containing water and/or air-bio filters such as microfiltration sponges filter the barn air as it passes through. These systems are costly and labor intensive.

Another approach involves spraying oil on the floors and sides of the barn. As the oil accumulates, however, it becomes increasingly more difficult to move across the slippery surfaces of the barn. Furthermore, the oil may contribute to a structural breakdown of the barn.

Ventilation is another approach. In tunnel ventilation, the air within a building is completely replaced about every 30 seconds. In winter, however, this method is often cost prohibitive due to heat loss. In recirculation ventilation, half of the air is vented outside of the building and the other half is routed back into the barn. Again, this method also causes heat loss, but to a lesser extent. Additionally, the dust and odors are not completely removed. In general, the dust vented to the outside air has been found to travel anywhere from five to eight miles from the source, thereby causing epidemics and disease transfer from farm to farm or from farm to community. Recently, 200,000 animals were destroyed in a single province of Spain due to disease transferred by this mechanism. Taiwan destroyed their entire swine herd after an outbreak of hoof and mouth disease.

Finally, another approach to alleviating the dust is the spraying of probiotic nonpathogenic bacteria. The probiotic bacteria denitrify ammonia causing gases and also bind to hydrogen sulfide thereby inhibiting odor. Although characterized as nonpathogenic, if the probiotic bacteria are cross-contaminated by pseudomonas or *E-coli* for example, rampant disease can result. The method is also labor intensive given that the bacteria must be applied every day.

In addition to dust and odor, high humidity is also a concern in the barn. During the fall, winter, and spring, relative humidity levels of approximately 90% are not uncommon.

Recent attention has also focused on the need for environmental control in and around manure pits. Odors resulting from many manure pits and containment areas significantly detract from the use, enjoyment, and value of surrounding property. The formation of a manure crust in certain pits seals the containment area thereby preventing natural aeration and contributing to an unbalanced anaerobic state. This results in an acute and malodorous buildup of methane, hydrogen sulfide, and other gases. The formation of the crust also creates a breeding ground for flies, believed to be another primary disease vector from the farm to the surrounding community. Birds, in turn, often feed on the fly larvae and constitute a secondary disease vector. Finally, crust formation also inhibits slurry removal thereby contributing to an inoperable pit. The benefits of odor control and crust prevention thus become obvious.

A recent study by the U.S. Senate details the magnitude of environmental problems caused by animal waste. The findings indicate that the amount of animal manure produced annually is conservatively estimated to be 130 times greater than the amount of human waste produced. Stated another way, a 50,000-acre farm in Utah has been cited as potentially producing more waste than the entire city of Los Angeles. Other findings indicate that agricultural officials consider 60% of rivers and streams "impaired", with agricultural runoff the largest contributor to the pollution. Anecdotally, a 30,000 fish kill resulted from a weekend hog manure spill in Iowa. Efforts are therefore currently underway to impose national standards on livestock producers. An improvement in the treatment of the manure is therefore needed.

On a state level, certain areas such as North Carolina have enacted moratoriums on new or expanding hog farms. North Carolina has also granted counties zoning control over farms with more than 5,000 hogs. Industry experts warn that as more restrictions are placed on U.S. hog farms, pork production could move to other countries thereby damaging family farms and sending food profits overseas. The net result of further restrictions limits the land use and therefore detracts from the profitability of the farmland.

Several methods of storage and/or disposal include aboveground slurry storage, belowground slurry storage, anaerobic pits with or without cover, aerated pits, oxidation ditches, and solid/liquid separation. Each method has its advantages and disadvantages such as costliness and ineffective odor control. To mitigate the odors, pit additives are often used with little to moderate success.

Scientists have attempted to reduce odors from the annual spring runoff into the North Saskatchewan River at Edmonton, Alberta. The odors have been characterized as septic, manure, musty, earthy, and hay-like. Despite oxidative treatment, the odors persisted thereby supporting the scientists' belief of the futility of relying strictly on oxidative treatment. Other odor control methods have incorporated aeration with costly additives to control the odors.

Other efforts are underway to reduce or eliminate manure odors. For example, the University of Minnesota Agricultural Engineering department recently began a project to measure, chart, and record odors emitted from different livestock production sites around Minnesota. As one engineer states, there is currently very limited knowledge about the odor from hog production systems. The main thrust of the project is to develop a database to assist communities and pork producers in developing reasonable expectations about odor. At the national Center for Agricultural Utilization Research in Peoria, Ill., researchers sought one million dollars to attack the malodorous nature of manure. Other problems tabled for action include air and groundwater quality.

The use of ozone is well known as a disinfectant or sterilizing agent. In general, due to its disinfecting properties, ozone has not been considered as a viable or feasible alternative when treating manure pits or lagoons. The conventional wisdom is that disinfection caused by the use of ozone would interfere with the microbiological balance within wastewater slurries whose solids are digested through the use of activated sludge.

Furthermore, the use of ozone within a confined area is subject to OSHA regulations. Exposure to concentrations of one part per million for over 10 minutes often leads to irritation of the eyes, nose, throat, and other adverse symptoms. The designs of ozone dispersal systems are often disadvantaged by an uneven distribution of ozone and therefore contribute to animal and human exposure to excess levels of ozone. A system designed to prevent accidental exposure to excessive levels of ozone would therefore be an improvement in the art.

DESCRIPTION OF THE RELATED ARE

The following references are herein incorporated by reference.

In the article entitled, "*EVALUATION OF ODOUR REMOVAL BY PILOT-SCALE BIOLOGICAL TREATMENT PROCESS TRAINS DURING SPRING RUNOFF IN AN ICE-COVERED RIVER*", Wat. Sci. Tech. Vol. 31, No. 11, pp. 195–201, (1995) S. E. Hrudley, P. M. Huck, M. J. Mitton, and S. L. Kenefick teach biological treatment of runoff water having a strong odor characterized as septic, manure, musty, earthy, and hay-like. Biological treatment using granular activated carbon can produce an essentially odor-free effluent during a transient raw-water odor event. On the other hand, for odor reduction the scientists teach the futility of relying on a strictly oxidative treatment such as ozone.

U.S. Pat. No. 5,397,474 to Henry teaches the use of air as an oxygen source that enables the breakdown of organic acids contained in manure through the use of facultative microorganisms.

U.S. Pat. No. 3,658,305 teaches aeration of liquid animal waste in a pit.

U.S. Pat. No. 3,633,547 to Stevens et al. teaches a system for maintaining an animal confinement area wherein liquid manure is aerated to eliminate objectionable odors.

U.S. Pat. No. 3,773,659 to Carlson et al. teaches liquid manure treated by enzymatic and aerobic biodegradation facilitated by enzyme producing microorganisms. The manure is removed from collection areas and introduced into reactors for treatment.

U.S. Pat. No. 3,960,718 to Lebo teaches the use of ozone as a sterilizing agent in sewage treatment.

U.S. Pat. No. 5,298,198 to LaCrosse teaches the purification of wastewater from a swine manure pond through an aerator at relatively low flow rates and pressures.

U.S. Pat. No. 3,884,804 to Robinson et al. teaches the use of "Contacogen" particles comprising solid catalyst portions having hydrophobic surface portions, wherein the particles are floated on the surface of a slurry of animal wastes. The particles promote the oxidation by air of the odoriferous compounds produced by the degenerative breakdown of the animal wastes.

U.S. Pat. No. 5,656,246 to Patapoff et al. teaches a wastewater treatment process incorporating ozone as a sterilizing agent, and oxidation technology. The waste must be transported to the reactor from the normal collection areas.

U.S. Pat. No. 5,071,566 to Papp et al. teaches a method of treating a slurry of liquid pig manure by simultaneously adding at several ingredients at separate and consecutive places in the flow direction of the liquid substance.

U.S. Pat. No. 5,290,451 to Koster et al. teaches a liquid manure treatment process incorporating an aerated reactor, a denitrification reactor, a liquid/solid separator, and sedimentationtanks. The waste must be transferred to the process from the normal collection areas.

U.S. Pat. No. 5,616,163 to Halfter teaches a liquid manure treatment process incorporating aeration as a method of stripping odorous substances.

U.S. Pat. No. 5,053,140 to Hurst teaches a method for food process water purificationutilizing ozonation. Ozone is clearly taught as destructive to bacteria Despite ongoing efforts, there is still a need for a cost-effective system that comprehensively reconciles the problems described above, and thereby reduces or eliminates manure odors in and around a manure collection pit, provides stable solids management within the pit, and reduces or eliminates the insect/fly population in and around the manure collection areas. Given the moratoriums on hog production due to ongoing odor concerns, it becomes quite clear that methods of control such as simple aeration and/or covering the smell through pit additives, for example, simply do not achieve the necessary odor reduction required.

SUMMARY OF THE INVENTION

The aforementioned problems are solved by an ozone injection system that homogeneously ozonates the air within a barn and, if necessary, also within an upper stratum of liquid manure contained in a manure pit housed within the barn. The homogeneously dispersed ozone significantly reduces the dust by functioning as a precipitating agent. In addition, the ozone significantly reduces the relative humidity by functioning as a coalescing agent. In further accordance with the present invention, an upper stratum of a liquid volume in the pit is ozonated while maintaining anaerobic conditions in a lower stratum. This permits anaerobic digestion of manure waste, for example, while still eliminating the odoriferous gases through oxidation in the ozonated/upper stratum.

Accordingly, an object of the present invention is to deodorize the air either within or exiting an animal containment area.

Another object of the present invention is to reduce the dust levels within the barn thereby eliminating a primary disease vector.

Another object of the present invention is to reduce the relative humidity of the barn.

Another object of the present invention is to deodorize the manure slurry contained within a manure pit.

Another object of the present invention is to reduce and/or eliminate the indigenous fly population.

Yet another object of the present invention is to prevent manure crust formation and eliminate a fly breeding ground, thereby further eliminating a primary disease vector from the farm to the community.

In accordance with these and other objects, the present invention oxidizes gases naturally associated and produced with manure, and also those gases resulting from its bacteriological breakdown. The injection of ozone into the contaminated air and fluids deodorizes and disinfects thereby effectively controlling the odors emitted therefrom. It has been discovered that ozone at lower levels does not interfere or destroy the microbiological balance within the pit. The pit balance is, counterintuitive to what would be expected, actually enhanced thereby facilitating an efficient breakdown of the solids within the pit. In addition, the ozone, through actual fly counts, has also been shown to reduce the fly population.

Ozone is pumped through remote or on site ozone generators through a perforated tube or plurality of tubes above the animals in the animal containment area The homogeneous distribution of ozone oxidizes the odorous gases within the barn air.

In a first approach to ozonating the pit, a perforated tube or plurality of perforated tubes extends across the pit within an upper portion of the total volume, most preferably in the upper fourth portion of the total volume. When ozone is forced into the perforated tubing, the gas is evenly dispersed through an upper portion of the liquid that approximates one fourth of the total volume. The odorous gases thus contact the ozone and are oxidized prior to their release into the atmosphere.

In a second approach to ozonating the pit, a buoyant vehicle is randomly and preferably propelled across the surface of the manure liquid by electrical propulsion. A preferred embodiment contains an electrically actuated pump thereby providing a propulsion means for propelling the vehicle across the surface of the pit. Ozone is diffused into the slurry by way of a gas injector. The ozone and electrical power are preferably introduced at or near the bottom of the pit. Ozone, at concentrations described herein, functions as a powerful oxidant that virtually eliminates the odors by killing the odor causing bacteria, oxidizing odorous gases, and yet maintaining a facultative aerobic/anaerobic microbiological balance in the manure slurry. The random movement of the buoyant vehicle creates an ozonated "cap" or oxidation zone in about the upper quarter of the slurry container, thereby eliminating the odor causing gases prior to their release into the atmosphere. Concurrently, an anaerobic state persists below the "cap" thereby permitting anaerobic digestion of the manure. The vehicle is also heavy enough to fragment any floating masses of manure crust thereby eliminating the fly breeding ground and also further inhibiting an anaerobic state and acute odors in the liquid manure.

DETAILED DESCRIPTION OF THE PREFERRED EMBODIMENT(S)

Figure 1:
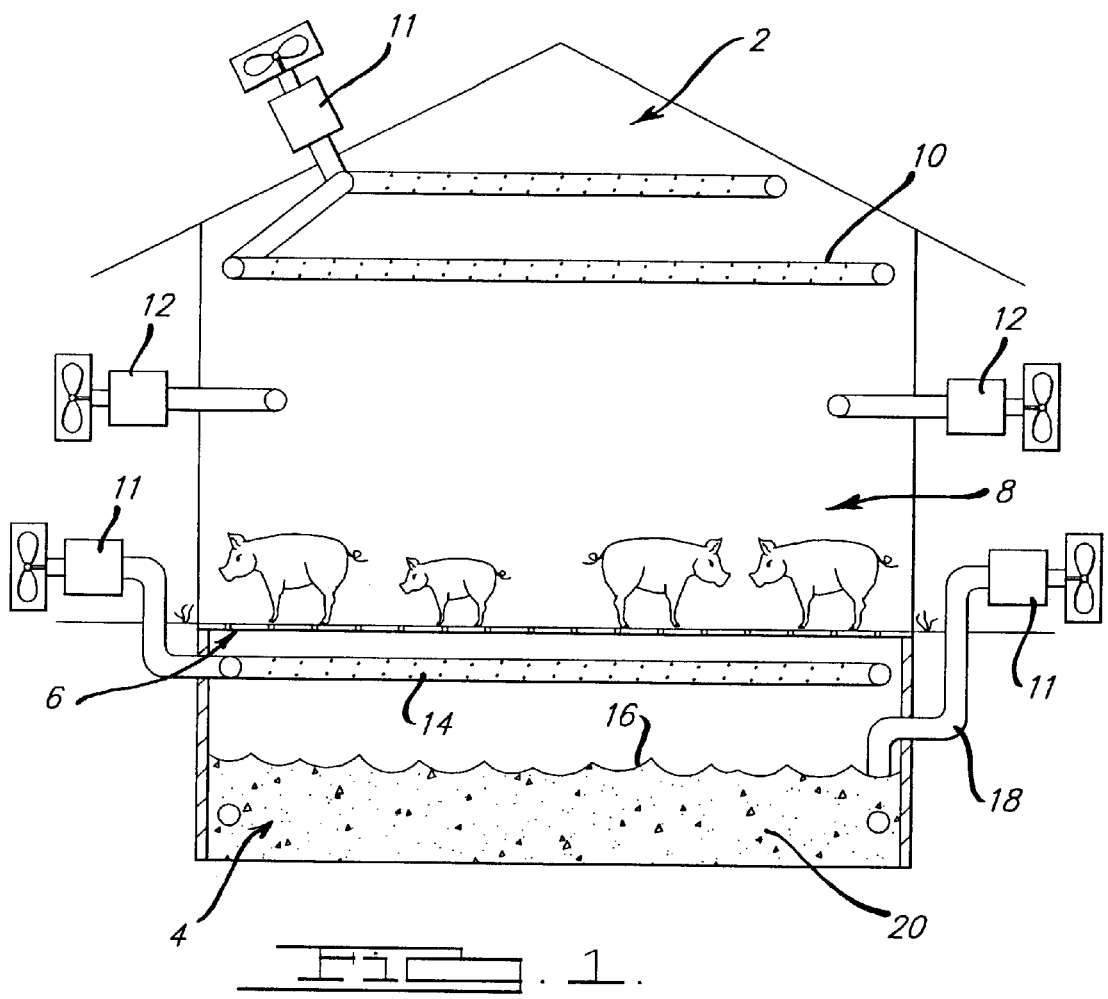
FIG. 1 illustrates a first embodiment of the present invention.

In a first embodiment shown in FIG. 1, an ozone injection system for a livestock building 2 containing a manure pit 4 covered by a grate 6 is illustrated. At least one set of one or more perforated tubes 10 extends about an animal containment area 8 thereby affecting homogeneous distribution of ozone throughout the air. The first set of one or more perforated tubes 10 fluidly communicates with an ozone generator 11 thereby oxidizing the contaminants within the air. If desired, optional ozone generators 12 may also target areas of acute odor. In a second aspect of the invention, the manure pit 4 is housed below the grate 6 through which manure is dropped by the livestock and then collected within the pit 4. An optional second set of one or more perforated tubes 14 extends across the gap between the grate and the surface 16 of the liquid volume within the pit 4. The second set of one or more perforated tubes 14 also fluidly communicates with the ozone generator 11. An ozone dispersal system 18 connected to an ozone generator 11 extends across an upper portion or "cap" 20 of the liquid volume within the pit 4, thereby controlling the odors and flies therein.

Figure 2:
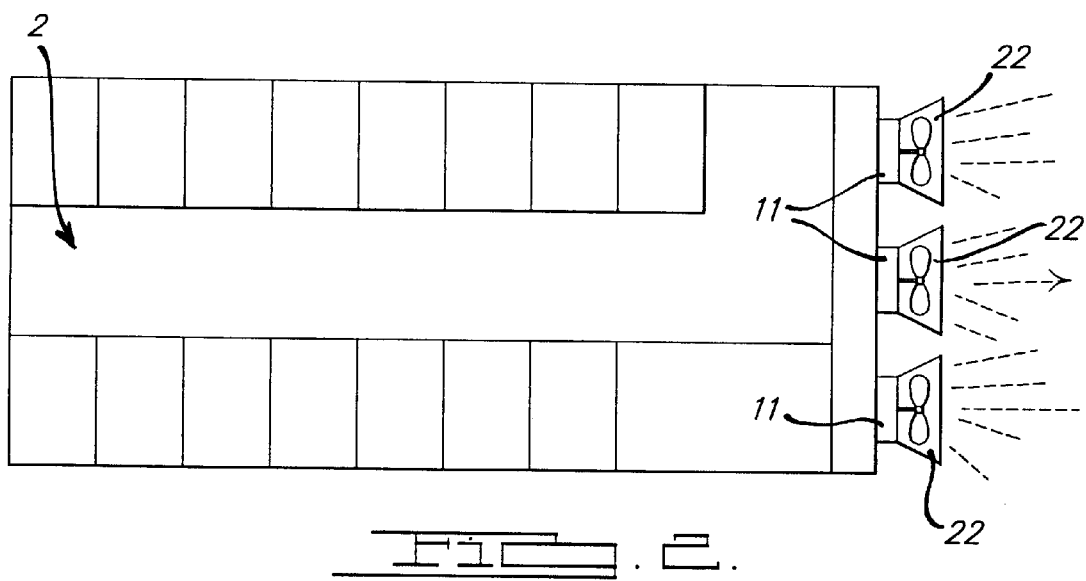
FIG. 2 illustrates a second embodiment of the present invention.

In a second embodiment shown in FIG. 2, a plurality of ozone generators 11 fluidly communicate with a corresponding plurality of exhaust fans 22. Odors are therefore ozonated and oxidized prior to venting outside of the building.

Figure 3:
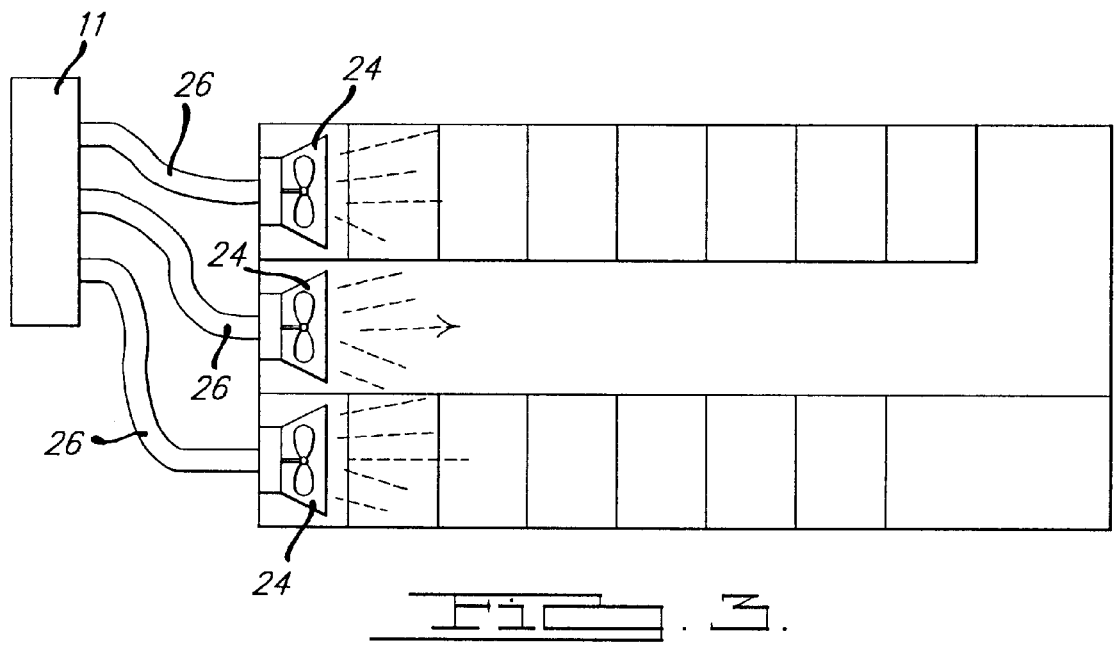
FIG. 3 illustrates a third embodiment of the present invention.

In a third embodiment shown in FIG. 3, an ozone generator(s) 11 fluidly communicates with a plurality of intake fans 24 bringing fresh air into the building. In contrast to the second embodiment, ozone is thus retained within the building for maximum effectiveness and reactivity. Additionally, the remote placement of the ozone generator 11 ensures that continual ozone production despite the breakdown of one or more of the plurality of fans 24 will not result in acute and excessive ozone odors within the barn. As shown in FIG. 3, the intake fans 24 draw the ozone through a series of airtight conduits 26. If operation of the fans 24 is interrupted, or if the conduit lines 26 are breached, the ozone will not accumulate within the barn 2 but rather remains in the ozone generation area. This passive characteristic clearly enhances the safety of the ozone injection system by preventing exposure to localized excessive ozone levels due to a failure of the dispersal system. The exhaust from the plurality of fans 24 is then connected to a plurality of sets of one or more perforated tubes 10 and 14, as shown in FIG. 1, for homogeneous distribution within the barn 2.

Figure 4:
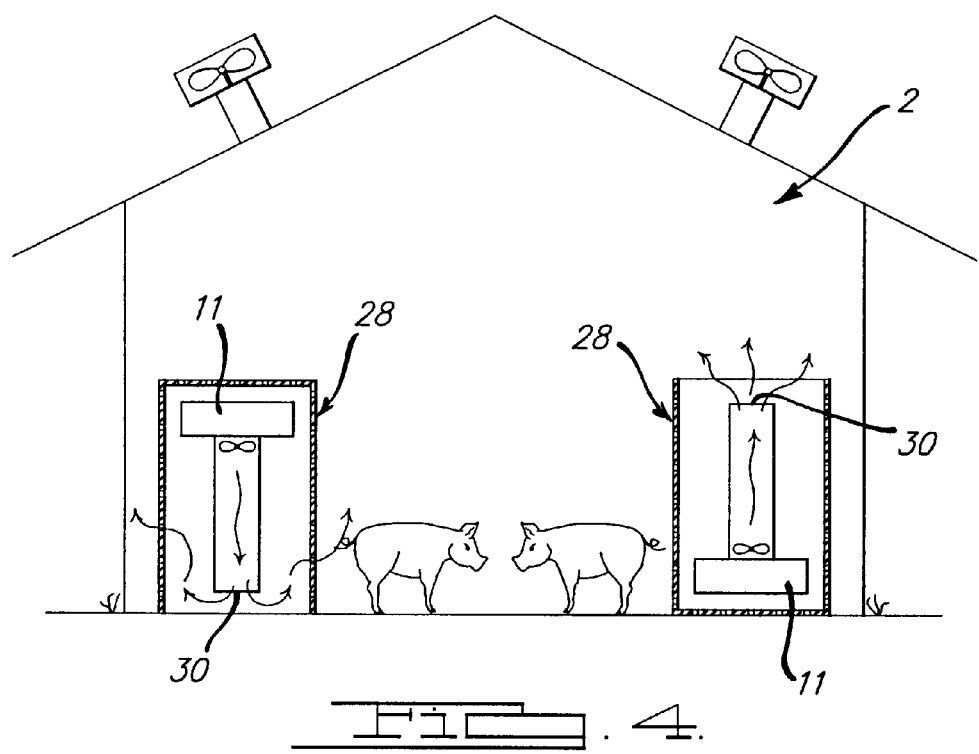
FIG. 4 illustrates a fourth embodiment of the present invention.

In a fourth embodiment shown in FIG. 4, if desired, ozone generators 11 are located within the building in areas of acute odor. A fence 28 surrounds the ozone generator 11 to insure that animals and humans are not exposed to excessive levels of ozone occurring immediately proximate to the generators 11. Alternately, the ozone generators 11 may also be hung from the ceiling in areas of acute odor. As the ozone flows through a dissipating end 30, the ozone levels are reduced to acceptable limits.

In each of the embodiments described above, the total ozone transferred to the interior of the barn 2 is about 0.02 to 0.1 parts per million at steady state. Nevertheless, ozone startup and makeup rates may be greater and may initially constitute for example, up to 0.2 PPM. In general, exposure to ozone concentrations above 1 part per million for over 10 minutes often leads to irritation to the eyes, nose, throat, and other adverse symptoms. Therefore, the ozone surrounding the generators at a minimum radius of two feet should not exceed 0.2 parts per million. These levels also apply to the air surrounding the tubes 3 and 6 extending about the interior of the building.

It has been unexpectedly discovered that the ozone levels applied in accordance with the present invention also contribute to a reduction in the fly population. It is believed that ozone retards maturation of the fly larvae thereby reducing the population. Fly counts before and after ozonation show a marked reduction in the number of flies present. As shown in Table 1, ozone also oxidizes odoriferous compounds found in untreated barn air.

TABLE 1

| Compound Tested | Ozonated | Untreated |
|---|---|---|
| $NH_4$ | 12 PPM | 22 PPM |
| $H_2S$ | .75 PPM | 1.25 PPM |
| $CO_2$ | 0.6% | 0.2% |

A SENSIDYNE™/GASTEC DETECTOR TUBE AIR SAMPLING SYSTEM was used to sample air taken from a barn having an air volume of 90,000 $ft^3$. For example only, the barn was treated using an ultraviolet ozone gas generator attached to a fan 20 feet in diameter and rated at 5000 cubic feet per minute. The ozone was transferred across the barn through a perforated tube 20 inches in diameter and 250 feet in length, wherein one-inch holes were evenly spaced 28 inches apart at the three and nine o'clock positions. As shown in Table 1, ammonia and hydrogen sulfide concentrations were substantially reduced after ozonation. One of ordinary skill in the art will readily appreciate the potential of altering the variables given above.

Figure 5:
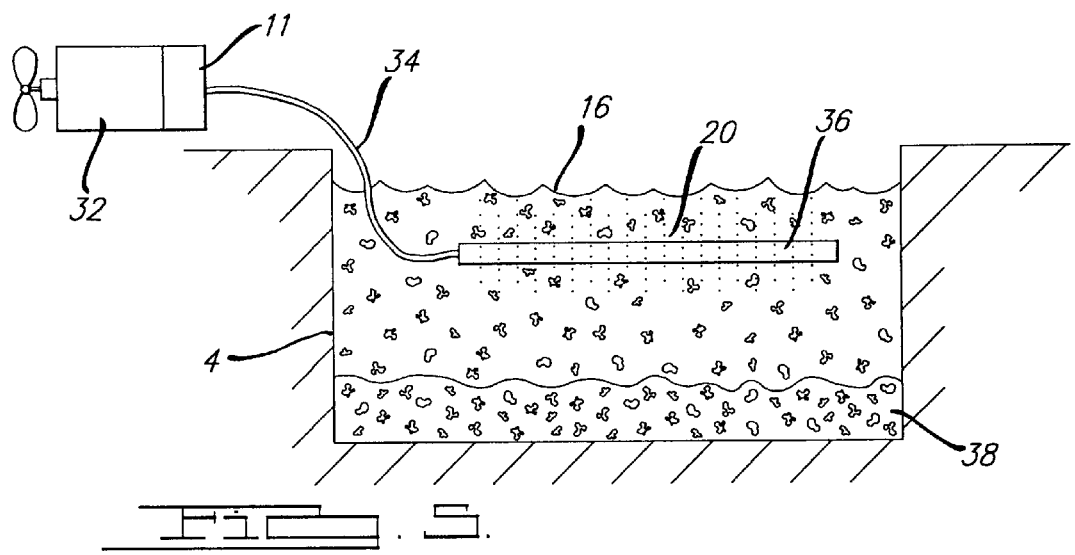
FIG. 5 illustrates a first approach to ozonating the pit in accordance with the present invention.

In a first approach to dispersing ozone within the pit, FIG. 5 shows a gas generator 11 containing a pump 32 fluidly communicating with an airtight tube or plurality of tubes 34. The generator 11 is housed next to a manure pit 4. Airtight tubes 34 fluidly communicate with a perforated tube or plurality of perforated tubes 36. As shown in FIG. 1, tubes 36 extend into the manure pit wherein holes within the tube(s) are preferably but not necessarily spaced one inch apart and thus facilitate an even percolation of ozone into the slurry. Gaseous ozone is produced by generator 11 and is transferred by pump 32 through airtight tube(s) 34 into the perforated tube or plurality of perforated tubes 36. In accordance with the present invention, ozone is supplied to the liquid within the cap 20 at about 0.1 to 1 milligrams of ozone per gallon of manure slurry per day (steady state), although startup and makeup rates may be greater. As shown in FIG. 1, a lower anaerobic stratum 38 is maintained in at least the lower half of the pit 4.

For example, the upper fourth of a 10-foot deep pit extends 2.5 feet down from the surface 16. This represents the treated "cap" 20, or in an untreated pit, a less turbid fluid based on sedimentation. For a pit consisting of approximately one million gallons, 250,000 gallons would be pumped at a rate of about 173.6 gallons/minute. Taking the ozone mass flow rate given above at 0.1–1 mg/gallon of slurry per day, the range of ozone generally required would be about 17.36–173.6 milligrams/minute. In essence, a one million-gallon manure pit would require about 25–1000 grams of ozone per day depending on the bacterial breakdown of the manure. As the bacterial activity increases, odoriferous gases such as hydrogen sulfide, ammonia, and methane are produced. Greater concentrations of bacteria, due to factors such as nutrient rich manure and increased temperature, will require greater concentrations of ozone to control the resulting odor and oxidize undesirable gases.

Figure 6:
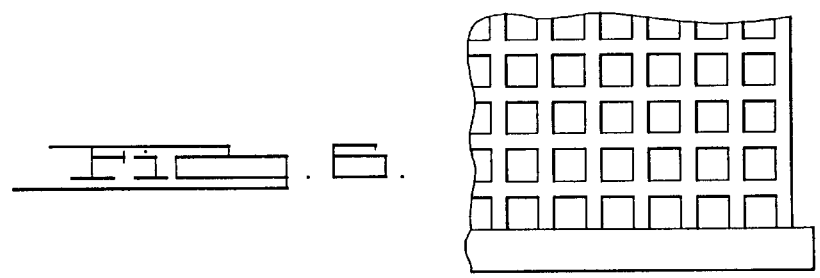
FIG. 6 illustrates a plurality of perforated tubes forming a grid.

The perforated tubes 36 are preferably arranged either in a grid network, as shown in FIG. 6, or in a plurality of horizontally parallel sections at one to two feet below the surface of the liquid. Each tubing 36 is preferably spaced 10 to 15 feet from other parallel sections in either the grid or parallel orientation. The "cap" 20, or upper stratum of treated liquid, is formed about the tubing 36 as a steady stream of stratified ozone reacts with the pollutants rising through the pit. The ozone bubbled into the liquid quickly reacts with gases such as mercaptans, methane, carbon monoxide, and other organic matter, and also functions as a pathogen disinfectant.

The temperature of the manure and the concentration of the waste gases will affect the residence time of the ozone. As the temperature decreases, the reaction time slows and the residence time of the ozone is increased. Conversely, the residence time is decreased as the temperature and reaction rate increase. In general, depending on the reaction conditions described above, the residence time of the ozone is believed to be between 0–5 minutes.

Figure 7:
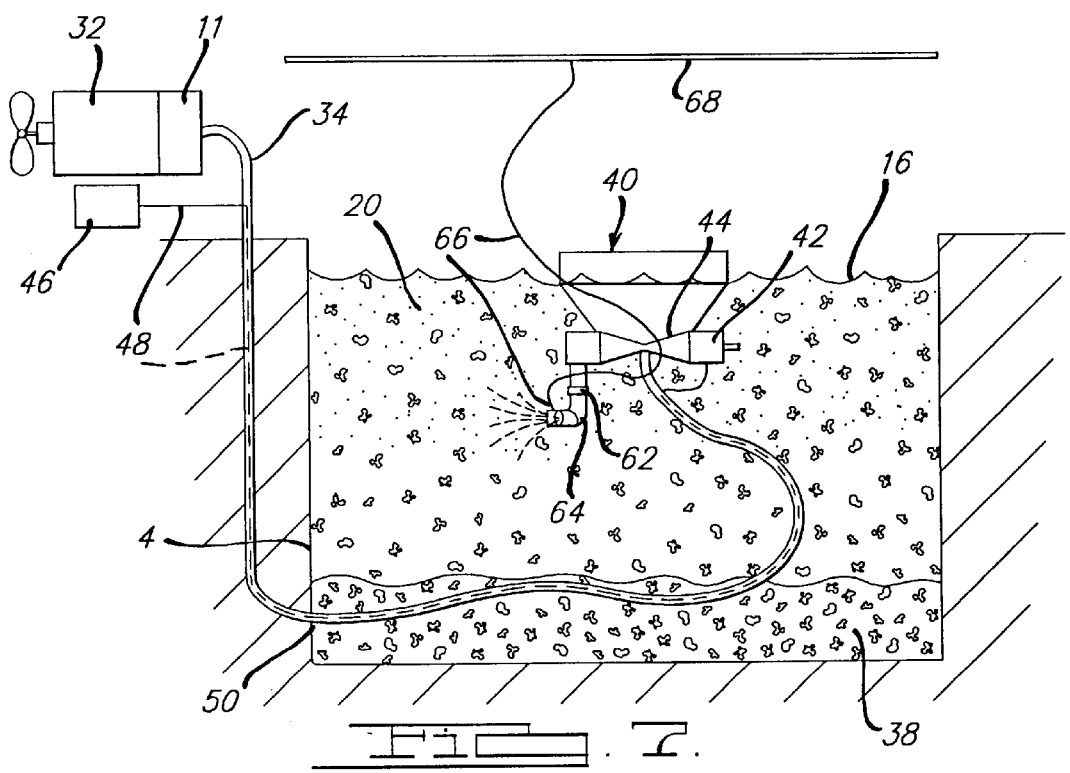
FIG. 7 illustrates a second approach to ozonating the pit in accordance with the present invention, wherein the buoyant vehicle shown not only ozonates the liquid containment area, but also fragments any crust tending to form on the surface of the slurry.
Figure 8:
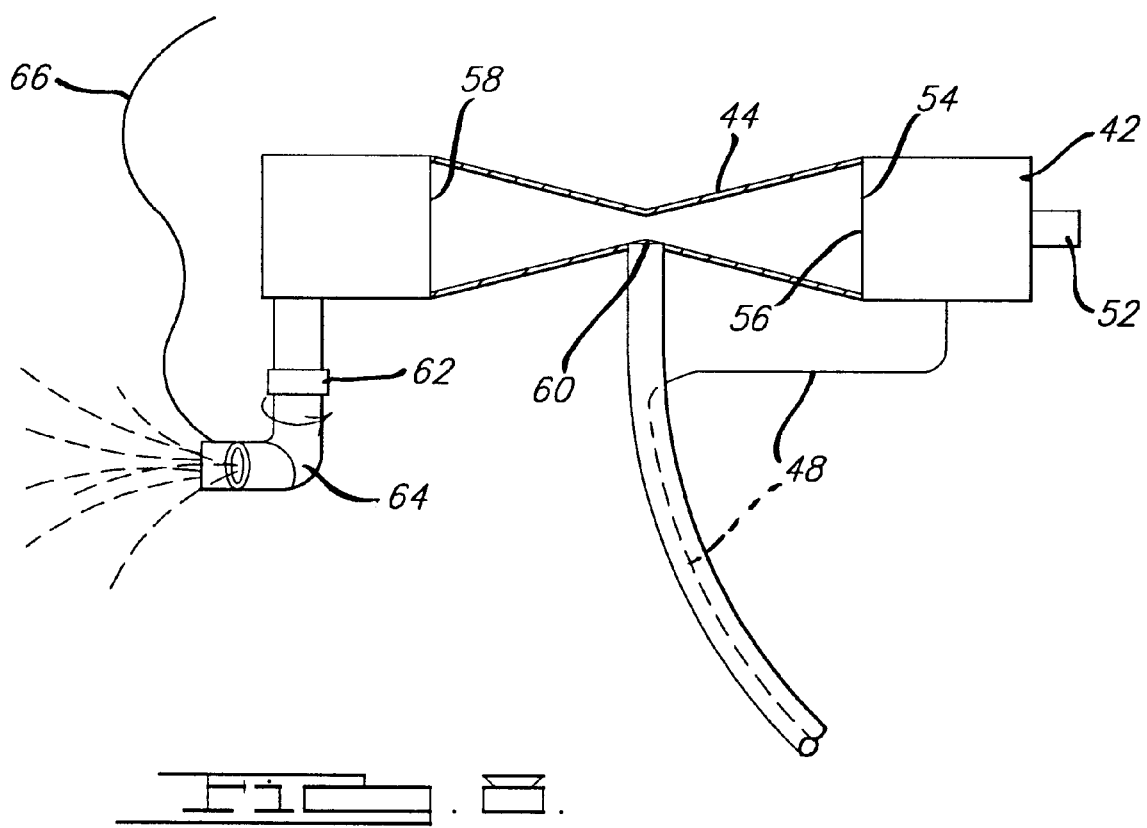
FIG. 8 illustrates a gas injector and a propulsion manifold employed in the second approach to ozonating the manure pit.

In a second approach to ozonating an upper stratum 20 within the pit 4, shown in FIG. 7, ozone produced by generator 11 is transferred by pump 32 through an insulated and airtight tube or plurality of tubes 34 to a buoyant vehicle 40. Additionally, as shown in FIGS. 7 and 8, the vehicle 40 contains a pump 42 and a gas injector 44 wherein the injector 44 is commercially available and sold by, for example, Mazzei Injector Corporation located in Bakersfield, Calif. In a preferred embodiment, an electrical source 46 actuates pump 42. As shown in FIGS. 7 and 8, an electrical line 48 supplies pump 42 with electrical power from source 46. In accordance with the present invention, insulated and airtight tube(s) 34 not only transfers ozone to injector 44, but also encloses the electrical line 48 thereby facilitating a safe transfer of electrical power. As further shown in FIG. 7, the electric power in line 48 and the ozone transferred from generator 11, both contained within the insulated and airtight tube(s) 34, are preferably introduced through an insulated port 50 near or at the bottom of the pit 4.

In accordance with the present invention and as shown in FIG. 8, the pump 42 contains an inlet port 52 in fluid communication with an outlet port 54. Injector 44 contains a liquid inlet port 56 fluidly communicating with pump outlet port 54, a liquid outlet port 58 fluidly communicating with liquid inlet port 56, and a gas inlet port 60 fluidly communicating with injectorports 56 and 58. A union 62 rotatably connects the liquid outlet port 58 of the gas injector 44 with a propulsion manifold 64 of vehicle 40. The propulsion manifold 64 is preferably bifurcated into two or more propulsion tubes at acute angles from one another. As the vehicle 40 is propelled across the surface 16 to either end of the container 4, the bifurcated propulsion manifold 64 exerts a bias on the rotatable union 62. The propulsion direction as shown in FIGS. 7 and 8 can thus be randomly varied without changing the general orientation of the vehicle 40. The bifurcated and rotatable propulsion manifold 64 thus prevents kinks in the airtight and insulated ozone/electric tube(s) 34 and yet still facilitates migration of the vehicle 40 throughout the pit 4.

A guideline 66, connected to a control line 68 extending above or below (not shown) the container, is also connected to the rotatable propulsion manifold 64. Movement of the vehicle 40 is thereby constrained to just within the periphery of the pit 4. Other configurations are also contemplated. For example, the guideline 66 could be rotatably connected to the top of vehicle 40. The vehicle 40 is preferably constructed from corrosion resistant materials such as stainless steel, fiberglass, or treated wood.

Vehicle 40 is thereby electrically propelled by pump 42 across the surface 16 of the cap 20 thin the container 4. The random movement of the vehicle 40 not only serves to distribute the ozone across the pit 4, but also agitates and mixes the ozone into the liquid thereby ensuring a homogeneous ozone dispersion within the resultant water cap 20. One of ordinary skill in the art will readily appreciate that other methods of propulsion may also be used.

In each approach, the effectiveness of the ozone may be improved simply through on-site filtration of the liquid within the pit 4. Flocculation, sedimentation, and other well-known filtration and separation techniques are effective in reducing the total suspended solids. Ozone may be produced by ultraviolet lighting, by cathode ray tubes, or by other methods known in the art. Ozone generators are commercially available, for example, from Fuller Ultraviolet Corporation in Frankfort, Ill. Due to maintenance ease, ultraviolet ozone generation is preferred.

Table 2 indicates various characteristics of a manure slurry within a pit operating under ozonated steady state conditions as described above. Sample 1 was taken shortly after steady state conditions were achieved. Sample 2 was taken about a month thereafter and illustrates the stability of the pit over an extended period of time. All tests were conducted based on methods documented in *Standard Methods for the Examination of Water and Wastewater*, 14$^{th}$ Edition (1975) and 15$^{th}$ Edition (1980), *Washington DC: American Public Health Association, Inc.*, the teachings of which are herein incorporated by reference.

TABLE 2

| Sample and Characteristic | Influent Pipe | Surface Bank | 1 Foot Depth Top | 2–3 Foot Depth Midpoint | 5 Foot to Bottom |
|---|---|---|---|---|---|
| Sample 1: NH3 nitrogen (mg/L) | 376 | 372 | 380 | 424 | 528 |
| Sample 2: NH3 nitrogen (mg/L) | 500 | 331 | 337 | 336 | 296 |
| Sample 1: BOD (mg/L) | 943 | 420 | NA | 360 | 360 |
| Sample 2: BOD (mg/L) | 541 | 122 | 120 | 143 | 217 |
| Sample 1: COD (mg/L) | 3222 | 1272 | 1016 | 1121 | 31936 |
| Sample 2: COD (mg/L) | 1908 | 753 | 644 | 803 | 1724 |
| Sample 1: TDS (mg/L) | 1360 | 1190 | 1240 | 1440 | 1330 |
| Sample 2: TDS (mg/L) | 1603 | 1050 | 1083 | 1113 | 1077 |
| Sample 1: pH | 7.41 | 7.45 | 7.55 | 7.82 | 7.38 |
| Sample 2: pH | 7.482 | 7.798 | 7.490 | 7.827 | 7.785 |
| Sample 1: Odor Average | 2.33 | 1.167 | 1.5 | 0.67 | 1.33 |
| Sample 1: Odor Std. Dev. | 0.52 | 1.169 | 1.38 | 0.52 | 0.52 |
| Sample 2: Odor Average | 3 | 0.167 | 0.167 | 0.333 | 0.333 |
| Sample 2: Odor Std. Dev. | 0 | 0.406 | 0.408 | 0.516 | 0.816 |

TABLE 2-continued

| Sample and Characteristic | Influent Pipe | Surface Bank | 1 Foot Depth Top | 2–3 Foot Depth Midpoint | 5 Foot to Bottom |
|---|---|---|---|---|---|
| Sample 1: Anaerobic Bac. Ave. Counts | $5.86 \times 10^6$ | $1.93 \times 10^6$ | $1.57 \times 10^6$ | $1.97 \times 10^6$ | $2.47 \times 10^6$ |
| Sample 1: Anaerobic Bac. Std. Dev. | $2.05 \times 10^6$ | $7.5 \times 10^5$ | $3.21 \times 10^5$ | $1.53 \times 10^5$ | $8.39 \times 10^5$ |
| Sample 2: Anaerobic Bac. Ave. Counts | $6.3 \times 10^6$ | $4.1 \times 10^5$ | $2.7 \times 10^5$ | $3.4 \times 10^5$ | $6.3 \times 10^5$ |
| Sample 2: Anaerobic Bac. Std. Dev. | $0.3 \times 10^6$ | $1.2 \times 10^5$ | $0.21 \times 10^5$ | $0.68 \times 10^5$ | $2.2 \times 10^6$ |
| Sample 1: Tot. Coliform Ave. MPN | $1.12 \times 10^6$ | $3.6 \times 10^4$ | $8.54 \times 10^5$ | $2.97 \times 10^4$ | $1.25 \times 10^4$ |
| Sample 1: Tot. Coliform Std. Dev. | $3.29 \times 10^5$ | $1.15 \times 10^4$ | $1.34 \times 10^6$ | $1.15 \times 10^4$ | $1.02 \times 10^4$ |
| Sample 2: Tot. Coliform Ave. MPN | $0.3 \times 10^6$ | $1.2 \times 10^5$ | $0.21 \times 10^5$ | $0.68 \times 10^5$ | $2.2 \times 10^6$ |
| Sample 2: Tot. Coliform Std. Dev. | $0.46 \times 10^5$ | NA | NA | $1.1 \times 10^5$ | $0.13 \times 10^5$ |

As shown in Table 2, the anaerobic and aerobic bacteria populations remain balanced with respect to each other throughout the month from Sample 1 to Sample 2. Additionally, the BOD data (biological oxidation demand) indicates a lower biological oxygen demand once the manure slurry leaves the influent pipe into the pit. In general, as the biological oxygen demand is reduced, the aerobic bacteria increase. This is, in addition to the bacterial counts given above, indicative of a balanced pit that results in optimum digestion and treatment of the manure. When the BOD increases, the anaerobic population remains, while the aerobic population is reduced. The outcome is inefficient digestion and poor organic breakdown. This of course leads to acute and volatile odoriferous compounds resulting from a dominant anaerobic activity. In fact, conventional wisdom recognizes that anaerobes in and of themselves digest organic material very slowly or constitute a "stuck digester", remaining in the acid generating mode. Aerobes, on the other hand, operate in a basic or neutral generating mode and thereby balance the acid produced by the anaerobes. The result of a balanced pit containing operable amounts of anaerobes and aerobes as shown in Table 2 (but not thereby limited) is thus a three-fold increase in the breakdown or digestion of organic matter. As shown in Table 2, the uniform pH values, the uniform values of total dissolved solids (TDS), and the consistent coliform counts throughout the pit depth, corroborate this theoretical understanding.

The chemical oxygen demand (COD) clearly shows that at upper depths of the container the COD is respectively much lower than at the lower depths. This indicates formation of the aerobic and anaerobic strata as explained above.

Six panelists trained in olfactory testing evaluated samples from various depths and rated the respective odors on a scale from 0–3 where 0=not offensive, 1=mildly offensive, 2=strongly offensive, and 3=very strongly offensive. As shown in both the Sample 1 group and the Sample 2 group, the odors of the manure containment area were significantly if not almost completely reduced as compared to the odor of the manure flowing through the influent pipe (i.e. not treated).

Additional data established by gas chromatography, and not shown in Table 2, indicates that ozone reduces the volatile phenols, cresol, and skatole. After treatment with ozone: phenols were reduced from 48 mg/L to 12 mg/L; ethyl phenol was reduced from 4.9 mg/L to 1.2 mg/L; cresol was reduced from 146 mg/L to 1.8 mg/L; and skatole was reduced from 2.6 mg/L to 0 mg/L. As evaluated by the purge and trap method, hydrogen sulfide was reduced from 21.0 mg/L to 11.0 mg/L after ozone treatment. The reduction of these odoriferous compounds parallels the odor tests and other data exhibited in Table 2.

Finally, one of the common misconceptions of ozone addition to a pit system is that ozone will deplete the bacteria and cause sterility of the pond, thereby inhibiting organic digestion. As shown in Table 2, contrary to conventional wisdom, the bacterial populations are not eliminated or significantly reduced over time. Rather, in accordance with the present invention, the applied ozone levels eliminate the odors but are not high enough to affect the overall bacterial load within the contained liquid. On a small scale, however, it is believed that the ozone at the concentrations given selectively reduces the pathogen load in the recycle water drawn from the pit. This is largely due to the fact that outside of a living host, pathogens are at a huge ecological disadvantage compared to the desirable bacteria Since the healthy bacteria readily propagate in a healthy pit, and the pathogens cannot (they are predominantly strictly anaerobes), a little ozone is also beneficial in this regard.

In sum, mechanical agitation and aeration due to ozone addition act to stimulate the aerobic activity of the pit. The outcome is cleaner and safer recycle water, a further reduction in odor, and a more aggressive solids control within the pit. Stated another way, the system acts synergistically to improve the health and the aesthetics of the liquid containment area and surrounding area In essence, ozone has been found to efficiently establish a healthy pit balance thereby resulting in the benefits described above. Furthermore, unlike other oxygenating gases, ozone is unique in that it consists entirely of oxygen and it also exhibits disinfecting as well as deodorizing properties In accordance with the present invention, when gaseous ozone is homogeneously dispersed, ozone functions as a coalescing agent thereby reducing the relative humidity from ranges such as 90–95% to ranges such as 55–65%. It is believed that ozone actually increases the weight of the moisture droplets subjecting them to gravity. In further accordance with the invention, homogeneous ozone also flocculates the dust particles thereby increasing their weight and thus precipitating the solids from the air. The dust carrier for airborne pathogens is thus largely removed from the interior of the barn, and yet does not contribute to the spread of disease. It should be noted that the same flocculation occurs in the "cap" of the pit as described above, thereby resulting in a marked clarification in the treated stratum.

While the preferred embodiments have been disclosed, one of ordinary skill in the art will readily appreciate that the invention is susceptible of modification without departing from the scope of the following claims.

I claim:

1. An ozone injection system for an animal containment area comprising air, said injection system comprising:
    one or more perforated tubes extending about the air in said animal containment area for transferring a mixture of ozone and air; and
    an ozone generator fluidly communicating with said one or more perforated tubes and an air supply,
    wherein a mixture of ozone and air is forced through said one or more perforated tubes and into the animal containment area, thereby affecting homogeneous distribution of ozone throughout the air in the animal containment area.

2. The system of claim 1 wherein ozone is supplied to the air at about 0.02 to 0.1 parts per million.

3. The ozone injection system of claim 1 wherein said ozone generator is remotely located respective to said animal containment area, said ozone injection system further comprising:
    one or more fans fluidly communicating with said ozone generator and with said one or more perforated tubes, wherein said one or more fans draw ozone to said animal containment area.

4. An ozone injection system for an animal containment area comprising air and a manure pit containing a liquid volume, said injection system comprising:
    one or more perforated tubes extending about the air in said animal containment area thereby affecting homogeneous distribution of ozone throughout the air;
    an ozone generator fluidly communicating with said one or more perforated tubes; and
    an ozone dispersal system in fluid communication with said manure pit wherein said dispersal system creates an upper ozonated stratum in said liquid volume and maintains an anaerobic stratum below said ozonated stratum,
    wherein said ozone generator fluidly communicates with said ozone dispersal system.

5. The system of claim 4 wherein said ozone generator supplies about 0.1 to 1 milligrams of ozone per gallon of liquid treated per day.

6. An ozone injection system for an animal containment area comprising air and a manure pit containing a liquid volume, said injection system comprising:
    a first set of one or more perforated tubes extending about an animal containment area thereby affecting homogeneous distribution of ozone throughout the air;
    a buoyant vehicle within said liquid volume;
    a liquid pump secured to said vehicle for propelling said vehicle across said liquid volume, said pump comprising an inlet port and an outlet port, said outlet port in fluid communication with said inlet port;
    a gas injector in fluid communication with said outlet port, said injector comprising a liquid inlet port, a liquid outlet port in fluid communication with said liquid inlet port, and a gas injection port;
    an ozone generator in fluid communication with said gas injection port and with said first set of one or more perforated tubes; and
    a propulsion manifold rotatably and fluidly communicating with said liquid outlet port, said propulsion manifold comprising one or more propulsion outlet ports for propelling said vehicle,
    wherein said vehicle is propelled across the pit thereby creating an upper ozonated stratum in said liquid volume and maintaining an anaerobic stratum below said ozonated stratum.

7. The system of claim 6 wherein said vehicle has at least one tapered end.

8. The system of claim 6 further comprising:
    a grated cover extending above said manure pit wherein a gap comprising air exists between said grated cover and said liquid volume; and
    a second set of one or more perforated tubes extending across said gap, wherein said ozone generator fluidly communicates with said second set of one or more perforated tubes extending across said gap thereby further homogeneously distributing ozone throughout the air.

9. An ozone injection system for an animal containment area comprising air and a manure pit containing a liquid volume, said injection system comprising:
    a first set of one or more perforated tubes extending about said animal containment area thereby affecting homogeneous distribution of ozone throughout the air;
    a second set of one or more perforated tubes extending within an upper portion of the liquid volume in said pit; and
    an ozone generator in fluid communication with said first and second sets of one or more perforated tubes,
    wherein said second set of one or more perforated tubes creates an upper ozonated stratum in said liquid volume.

10. The system of claim 9 further comprising:
    a grated cover extending above said manure pit wherein a gap comprising air exists between said grated cover and said liquid volume; and
    a third set of one or more perforated tubes extending across said gap,
    wherein said ozone generator fluidly communicates with said third set of one or more perforated tubes extending across said gap thereby homogeneously distributing ozone.

* * * * *